June 5, 1945.   C. R. SHUEY   2,377,723
TRAILER LOGGING BUNK
Filed March 20, 1942   2 Sheets-Sheet 1

Inventor
Charles R. Shuey
By Clarence A. O'Brien
and Harvey B. Jacobson
Attorneys June 5, 1945. C. R. SHUEY 2,377,723
TRAILER LOGGING BUNK
Filed March 20, 1942 2 Sheets-Sheet 2

Inventor
Charles R. Shuey
By Clarence A. O'Brien
and Harvey B. Jacobson
Attorneys Patented June 5, 1945

2,377,723

UNITED STATES PATENT OFFICE 2,377,723

TRAILER LOGGING BUNK

Charles R. Shuey, Spokane, Wash.

Application March 20, 1942, Serial No. 435,589

1 Claim. (Cl. 267—60)

My invention relates to trailer logging bunks of the type forming the subject matter of my U. S. Letters Patent No. 2,255,863, dated September 16, 1941, and more particularly to improvements in axle mountings for such bunks.

The principal object of the invention is to provide an axle mounting adapted to reduce vibration and thereby prolong the life of the trailer bunk and reduce wear on the tires.

Other and subordinate objects are also comprehended by my invention, all of which, together with the precise nature of my improvements, will be readily understood when the succeeding description and claim are read with reference to the drawings accompanying and forming part of this specification.

Figure 1:
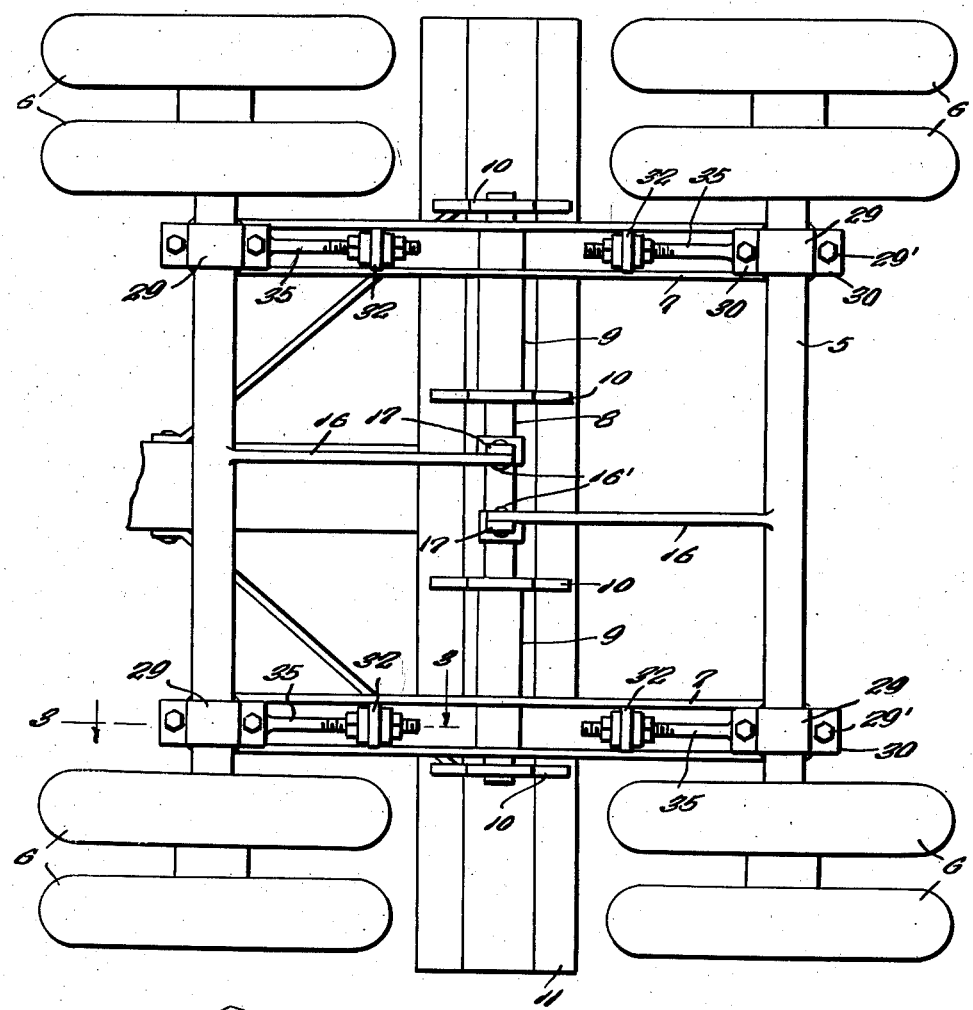
Figure 5:
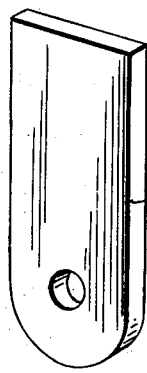
Figure 2:
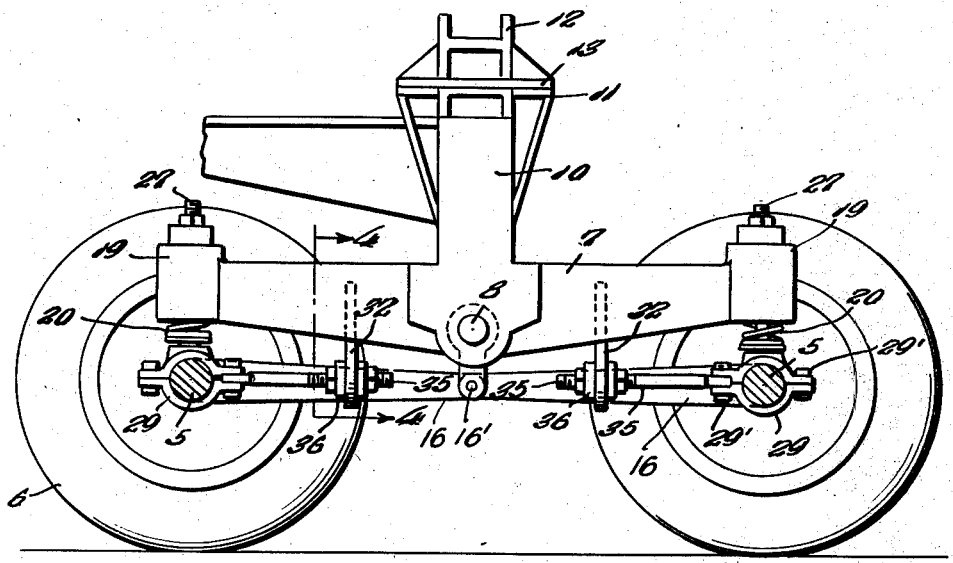
Figure 3:
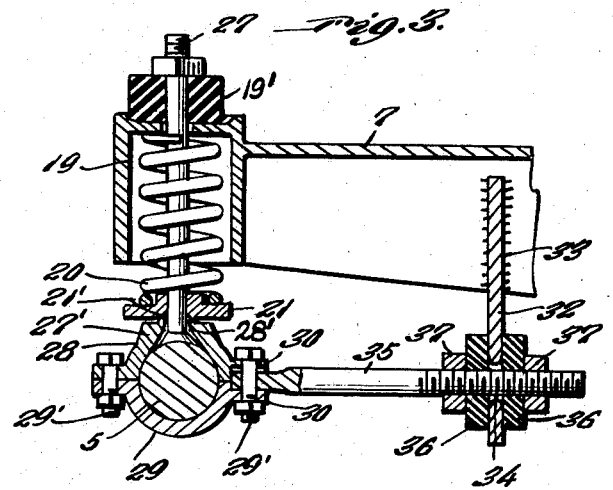
Figure 4:
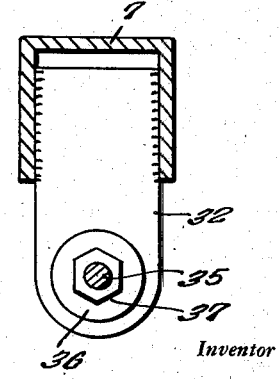
Figure 6:

In said drawings:

Figure 1 is a view in bottom plan illustrating a trailer logging bunk embodying my improved axle mountings, Figure 2 is a view in side elevation, with the axle shown in section, Figure 3 is a fragmentary view in longitudinal vertical section taken on the line 3—3 of Figure 1 and drawn to an enlarged scale, Figure 4 is a view in vertical transverse section taken on the line 4—4 of Figure 2, Figure 5 is a view in perspective of one of the brackets, and Figure 6 is a fragmentary view in plan of one of the axle anchoring rods.

Referring to the drawings by numerals, the trailer logging bunk with which my improvements are more particularly concerned includes a pair of spaced parallel axles 5 equipped at their ends with dual rubber tired wheels 6. The axles 5 are anchored, in a manner presently described, to a pair of longitudinally extending side frame members 7 of channel form in cross-section arranged with open sides lowermost. An intermediate transversely extending rock shaft 8 is journaled at its ends in a pair of sleeves 9 fixed on the frame members 7 and a plurality of upstanding supporting members 10 having their lower ends fixed to the shaft 8 support at their upper ends a transversely extending bolster platform 11. Above the platform 11 is a bolster 12 resting on a base 13 from which a pin 14, not shown, projects for rotatably mounting the bolster 12. A pair of arms 16 fixed at one end to the axles 5, respectively, and pivotally connected, as at 16', to crank arms 17 swingably mounted on the rock shaft 8 limits rocking movement of said shaft.

At the ends thereof, the side frame members 7 are equipped with shock absorbers for mounting said members on the axles 5. Each shock absorber includes a cylindrical spring housing 19 and a coil spring 20 extending out of the bottom of the housing and seated upon a thrust plate 21 having a central bottom socket 21' therein of arcuate concavity. A bolt 27 extends vertically through the closed top of a housing 19, a cushion block 19' on top of said housing, and through the spring 20 and plate 21, said bolt being vertically movable through the plate 21 and having a beveled head 27' lowermost. As shown in Figure 3, the bolt 27 extends through the top of the housing 19 with a clearance, the spring 20 clears said housing, and the head 27' of said bolt is arranged to fulcrum in the upper clip member 28 so that the bolt 27 can swing laterally without binding.

Coming now to my improvements, each axle 5 is provided with a pair of bearings directly beneath the bolts 27 and each comprising a pair of upper and lower clip members 28, 29 bolted together by a pair of upright bolts 29' extending through lateral lugs 30 on the members. The upper clip member 28 is formed with a rounded bearing 28' seating in the socket 21' of the plate 21 and forming with said socket a ball and socket joint and said clip member is bored centrally to receive the bolt 27 so that the head of the bolt rests on the axle. Each bearing is connected to the side frame member 7 on the same side of the structure as the bearing and by the following means: A bracket plate 32 depends from the side frame member 7, said plate being welded, as at 33, in said member and being provided with an aperture 34 in its lower end. A rod 35 is pivoted at one end on one bolt 29' of the bearing between the lugs 30 through which said bolt extends and for lateral swinging movement on said bolt. The other end of the rod 35 is slidably and pivotally extended through the aperture 34 in the bracket plate 32. A pair of heavy, centrally apertured bumper blocks 36 are sleeved onto the rod 35 upon opposite sides of the bracket plate 32, respectively, and clamped against the plate by a pair of nuts 37 threaded onto said rod. As will be understood, the aperture 34 in the bracket plate 32 provides for fulcruming action of the rod 35 therein vertically and laterally.

As will now be seen, the described mounting provides for vertical floating movement of the axle 5 relative to the side frame member 7 and the rod 35, blocks 36 and bracket plate 32 form shock absorbing means for yieldingly opposing tendency of the axle to move laterally, the rods 35 acting to thrust, or pull, the nuts 37 against the bumper blocks 36, respectively, according to the direction in which the axles 5 move laterally, the described ball and socket joint between the front plate 21 and the upper clip member 28 obviating binding between said plate and clip and between said plate and the rod 21.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the subjoined claim.

What I claim is:

In a trailer logging bunk including a side frame member, a subjacent axle, means for mounting the frame member on the axle and permitting vertical and lateral play of the axle, said means comprising an axle bearing, a thrust plate on top of said bearing, a spring exerting downward pressure against said plate, and a ball and socket joint between said bearing and plate, and shock absorbing means connecting said bearing with said frame member and opposing lateral play of the axle, said last-named means comprising a bracket plate depending from the frame member, a rod pivoted at one end on said bearing for lateral play thereon and slidably and pivotally extended at its other end through said bracket, a pair of resilient apertured bumper blocks sleeved onto said rod upon opposite sides of said bracket plate, and nuts threaded onto said rod and clamping the blocks against said bracket plate.

CHARLES R. SHUEY.